(12) United States Patent
König

(10) Patent No.: US 8,525,457 B2
(45) Date of Patent: Sep. 3, 2013

(54) EC MOTOR ASSEMBLY

(75) Inventor: Daniel König, Gerabronn (DE)

(73) Assignee: EBM-Papst Mulfingen GmbH & Co. KG, Mulfingen (DE)

( * ) Notice: Subject to any disclaimer, the term of this patent is extended or adjusted under 35 U.S.C. 154(b) by 352 days.

(21) Appl. No.: 12/972,579

(22) Filed: Dec. 20, 2010

(65) Prior Publication Data

US 2011/0169435 A1 Jul. 14, 2011

(30) Foreign Application Priority Data

Jan. 12, 2010 (EP) .................................... 10150536

(51) Int. Cl.
*H02P 27/00* (2006.01)

(52) U.S. Cl.
USPC ........................................ 318/400.3; 318/139

(58) Field of Classification Search
USPC ............... 307/86, 64, 66, 72; 318/400.3, 139
See application file for complete search history.

(56) References Cited

U.S. PATENT DOCUMENTS

| 4,366,388 A * | 12/1982 | Wilkerson ....................... 307/46 |
| 4,794,272 A * | 12/1988 | Bavaro et al. .................... 307/66 |
| 5,493,155 A | 2/1996 | Okamoto et al. |
| 6,369,536 B2 * | 4/2002 | Beifus et al. ............. 318/400.12 |
| 6,949,899 B2 * | 9/2005 | Horng et al. ................ 318/400.3 |
| 7,145,265 B2 * | 12/2006 | Mc Nulty et al. ................ 307/44 |
| 7,256,566 B2 * | 8/2007 | Bhavaraju et al. ............. 320/101 |
| 2008/0218917 A1 * | 9/2008 | Archer ............................ 361/33 |
| 2008/0236648 A1 * | 10/2008 | Klein et al. .................... 136/244 |

FOREIGN PATENT DOCUMENTS

| DE | 35 19560 A1 | 12/1986 |
| DE | 195 38 946 C1 | 4/1997 |
| EP | 0 950 575 A1 | 10/1999 |
| JP | 8-331889 | 12/1996 |
| JP | 11-351057 | 12/1999 |

OTHER PUBLICATIONS

EP 10 15 0536—International Search Report—Apr. 19, 2010.

* cited by examiner

*Primary Examiner* — Rina Duda
(74) *Attorney, Agent, or Firm* — Brinks Hofer Gilson & Lione

(57) ABSTRACT

The present invention relates to an EC motor assembly (1) having an electronically commutated, permanent magnet-excited DC motor (M) with an upstream commutation electronic unit (2) that is supplied with a DC link voltage ($U_{ZK}$) via a DC link (8). The DC link (8) can be connected directly to a solar cell generator (12) via a first voltage input (10) on one hand, and on the other, to a grid voltage ($U_M$) via a controllable power supply unit (14) and a second voltage input (16). The DC link voltage ($U_{ZK}$) is variably specified based on a respective available photovoltaic voltage ($U_{PV}$) of the solar cell generator (12). The power supply unit (14) can be regulated with respect to the output voltage thereof to adapt to the respective DC link voltage ($U_{ZK}$).

6 Claims, 2 Drawing Sheets

EC MOTOR ASSEMBLY

CROSS REFERENCE TO RELATED APPLICATION

This application claims priority to European Patent Application No. 10150536.0, filed Jan. 12, 2010.

FIELD OF THE INVENTION

The present invention relates to a motor assembly comprising an electronically commutated (EC) permanent magnet-excited DC motor having an upstream commutation electronic system that is supplied with a DC link voltage via a DC link.

BACKGROUND OF THE INVENTION

EC (EC=electronically commutated) motors of the above referenced general type are sufficiently well known and are used for a number of applications. As is known, an EC motor is a permanent magnet-excited synchronous motor without a slip ring and is provided with a rotor position sensor and operated with a DC current via a commutation electronics unit (control and power electronics). This DC voltage can be provided as a DC link voltage by rectifying an alternating voltage from the power grid. As a function of the rotor position, the commutation electronics unit generates an AC voltage, in particular a three-phase AC voltage, from the DC voltage in order to generate a rotary field in the stator winding.

EC motors have many advantages. Because of their electronic commutation without a slip ring, neither brush noise nor wear occurs. These motors are therefore maintenance-free. Due to the electronic controller, additional functions such as stepless speed control, rotational direction reversal, soft startup and/or lock-up protection can be implemented without difficulty. The speed is generally adjusted by PWM clocking with an adjustable or controllable duty cycle.

For many applications there is the desire, based on economic and environmental reasons, to operate such EC motors with solar energy, this being by means of solar cell generators with a photovoltaic voltage.

For example, the document U.S. Pat. No. 5,493,155 A describes an electrical supply system for an electrical drive unit, for example a compressor for an air conditioning system or refrigerating machine, wherein a DC link is directly supplied via a rectifier from a grid voltage of a public supply grid. In addition, a solar cell generator (solar panel) is connected to the DC link, specifically via a controllable DC/DC converter, by means of which the photovoltaic voltage, which varies depending on the solar irradiation, is adapted to the DC link voltage provided by the rectified grid voltage. However, the DC/DC converter required in the solar circuit leads to an additional expense for circuitry and components as well as a reduced efficiency of the solar energy.

SUMMARY OF THE INVENTION

The present invention is therefore based on the problem of creating an EC motor of the type mentioned above that can be operated with good efficiency and low component complexity selectively with a photovoltaic voltage from a solar cell generator and/or with a grid voltage.

Accordingly it is provided by the invention that the DC link can be connected on the one hand directly to a solar cell generator via a first voltage input and, on the other, via a controllable power supply unit and a second voltage input to a grid voltage, wherein the DC link voltage is variably specified based on the respective photovoltaic voltage of the solar cell generator, and the power supply unit can be regulated with respect to the output voltage thereof to adapt to the respective DC link voltage.

Due to this voltage adaptation, the currents resulting from the respective voltages can advantageously be combined in a circuit node and thus added up into the DC link current in practice. The motor is then operated with the power that results from the respective product of the DC link current and the DC link voltage.

In a preferred embodiment, the power supply unit is regulated via an MPP regulator (MPP=maximum power point) in the range of maximum possible power of the solar cell generator. By means of the MPP regulator (MPP tracker), the solar cell generator can always be operated in the optimal power range.

In order to be able to ensure operation of the EC motor even if only a low or no photovoltaic voltage is available, it can be provided in an additional advantageous embodiment that, in case the photovoltaic voltage is absent or falls below a defined limit value approaching zero, a predetermined DC link voltage value that is still sufficient to operate the direct current motor is adjusted by means of the power supply unit.

In connection with the invention, it is further advantageous if the commutation electronics unit has a speed control function, in order to keep the motor speed constant even in case of a varying DC link voltage. The commutation electronics unit comprises, as is known, a power output stage with controlled circuit breakers arranged in a full bridge circuit and an associated control unit that actuates the circuit breakers as a function of the rotary position of the rotor.

In a preferred embodiment, the commutation electronics, together with the controllable power supply unit and the MPP regulator, forms an electronic unit integrated into a motor housing, the unit being accommodated in particular on at least one common circuit board. The power supply unit is preferably designed as an AC/DC switching power supply, which preferably comprises an integrated voltage controller.

BRIEF DESCRIPTION OF THE DRAWINGS

A preferred embodiment of the invention will be explained in detail below with reference to the drawing. Shown are.

DETAILED DESCRIPTION OF THE INVENTION

Figure 1:
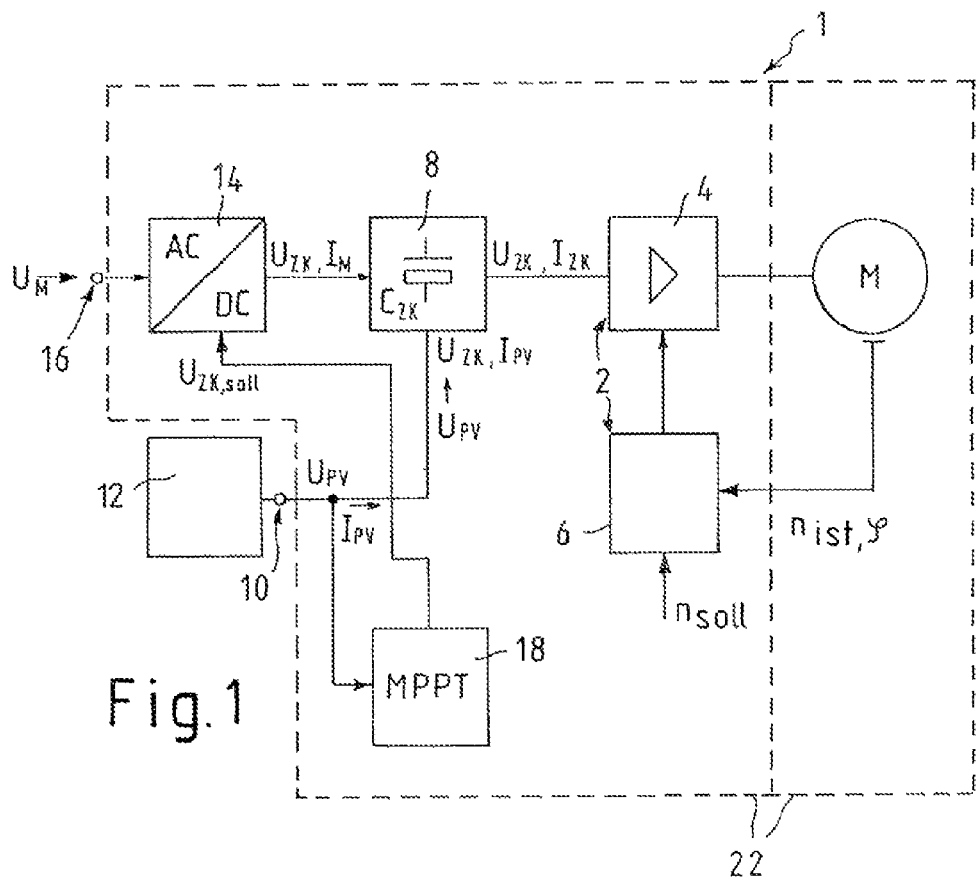
FIG. 1 shows a block diagram of the EC motor assembly according to the invention.

As follows firstly from FIG. 1, an EC motor assembly 1 according to the invention comprises an electronically commuted, permanent magnet-excited DC motor M having an upstream commutation electronics unit 2. The commutation electronics unit 2 in turn comprises a power output stage 4 with controlled circuit breakers (in particular transistors), not shown in detail, arranged in a full bridge circuit, as well as an associated control unit 6 with rotational speed control. The motor M is supplied via the output stage 4 and via a DC link 8 with a DC link voltage $U_{ZK}$.

In the control unit 6, the usual commutation logic system for actuating the output stage 4 is implicitly present, in addition to the speed control unit. By controlling the speed, the control unit 6 adjusts the energy at the motor M with pulse-width modulation by means of a so-called duty cycle in such a manner that the rotational speed, which is specified by a target value $n_{soll}$, is achieved and then maintained.

According to the invention, the DC link 8 in turn is connected, or can be connected, directly to a solar cell generator 12 via a first voltage input 10 on the one hand, and on the other, to a grid voltage $U_M$ (M=mains) via a controllable power supply unit 14 and a second voltage input 16. Thus, according to the invention, the DC link voltage $U_{ZK}$ is variably specified based on a respective photovoltaic voltage $U_{PV}$ of the solar cell generator 12, and the power supply unit 14 can be regulated with respect to the output voltage thereof to adapt to the respective DC link voltage $U_{ZK}$. By means of this voltage adaptation, the currents resulting from the respective voltages (solar current $I_{PV}$, power grid current $I_M$) can advantageously be combined in a circuit node P (see FIG. 2) and thus added up to form the DC link current $I_{ZK}$ in practice; the relation=$I_{PV}+I_M$ applies in this case. The motor M is then operated with the power that results from the respective product of the DC link current and the DC link voltage: $P=I_{ZK} \cdot U_{ZK}$.

In a preferred embodiment, the power supply unit 14 is regulated via an MPP regulator 18 in the range of the maximum possible power of the solar cell generator 12. For this purpose, the MPP regulator 18 is supplied with the respective values of the solar current $I_{PV}$ and the solar voltage $U_{PV}$. Based on these values, the MPP regulator 18 forms a target value $U_{ZKsoll}$, which is fed to the power supply unit 14 to adjust the corresponding DC link voltage $U_{ZK}$.

For the case in which the photovoltaic voltage $U_{PV}$ is completely absent or falls below a defined limit value approaching zero, a predetermined DC link voltage value $U_{ZKmin}$ that is still sufficient to operate the motor M is adjusted by means of the power supply unit 14.

In the preferred embodiment, the power supply unit 14 is designed as an AC/DC switching power supply. According to FIG. 2, the power supply unit 14 contains an integrated voltage regulator 20.

As is illustrated by way of example in FIG. 1, the commutation electronics unit 2, together with the power supply unit 14, a DC link capacitor $C_{ZK}$ of the DC link 8, and preferably also the MPP regulator 18, forms an electronics unit, which is preferably arranged on at least one common circuit board and integrated into a motor housing. In this manner, the EC motor assembly 1, together with all the required components, can have a compact design, wherein the two voltage inputs 10 and 16 can selectively be connected to the respective voltages, which is to say the grid voltage UM and/or the solar cell generator 12. The motor housing is indicated in FIG. 1 by a dash line 22.

So-called MPP tracking (MPP=maximum power point) is a method known in photovoltaic technology for operating solar cells in the optimal power range. With a constant motor operating point, the MPP regulator 18 varies the DC link voltage via the power supply unit 14 in such a manner that the respective maximum amount of energy available is drawn from the solar cell generator 12. Thus the DC link voltage is dependent on the operating point of the solar cell, which in turn depends on the solar irradiation and the module temperature.

Figure 3:
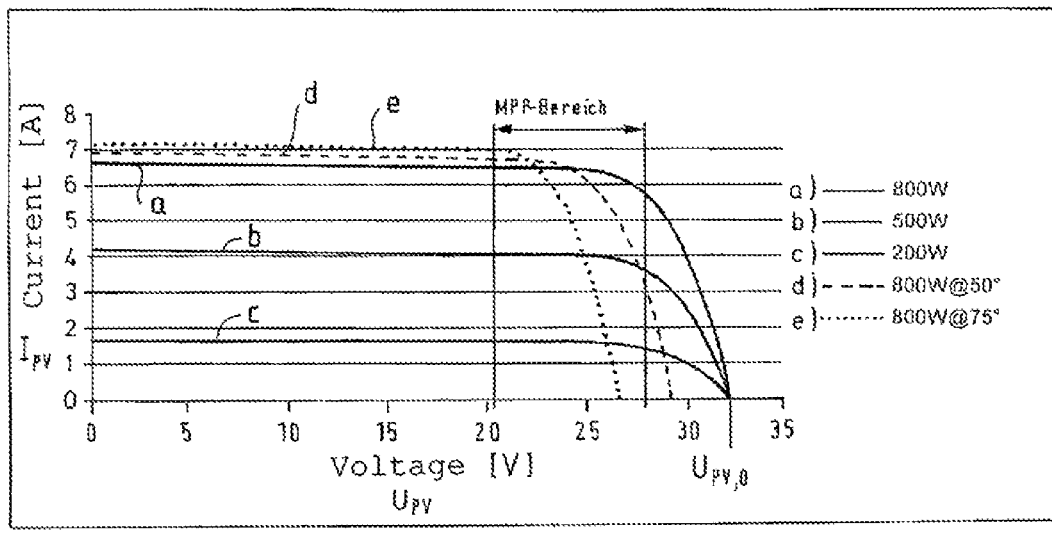
FIG. 3 shows a schematic characteristic curve diagram of a solar cell.

Reference is made in this regard to the diagram in FIG. 3, in which some characteristic curves are shown by way of example. The optimum power range is referred to as the MPP range.

The EC motor assembly 1 according to the invention can, in principle, operate in three different modes:

1. Pure network connection, wherein the required energy is supplied 100% from the power grid.

2. Pure solar connection without additional supply from the power grid; two sub-cases can occur here:

The solar cell generator 12 supplies more energy than the motor requires. In this case the solar cell generator 12 can also be operated outside of the MPP range. The voltage is adjusted down corresponding to the characteristic curve.

The energy from the solar generator 12 does not suffice even in the MPP range to reach the actually required target value. Because or if no additional supply from the power grid is available, only the maximum possible energy from the solar cell generator 12 is used for operating the motor.

3. Bivalent operation with simultaneous solar and power grid supply; here as well, two sub-cases can occur:

The energy of the solar cell generator 12 is not sufficient to reach the target value. In this case, the additionally required energy is drawn from the power grid, with the solar cell generator 12 being operated in the MPP range in any case.

The solar energy is sufficient to reach the target value. In this case the solar cell generator 12 can be operated outside of the MPP range without supply from the power grid.

Thus the energy is supplied from the power grid only if the energy from the solar cell generator 12 does not suffice to reach the respectively desired motor operating point. Advantageously, only the component of the energy necessary to adequately supply the motor that cannot be delivered by the solar cell generator 12 is drawn from the power grid.

If excess energy is available from the solar cell generator 12, it can remain unused, but preferably it can be fed back into the grid. For this purpose, means, not shown in FIGS. 1 and 2, for the recovery of excess energy from the DC link 8 can be provided. For this purpose, the DC link voltage $U_{ZK}$ is monitored, and in case a predetermined limit value is exceeded, is fed back into the grid via the power supply unit 14, configured bivalently for this purpose.

Figure 2:
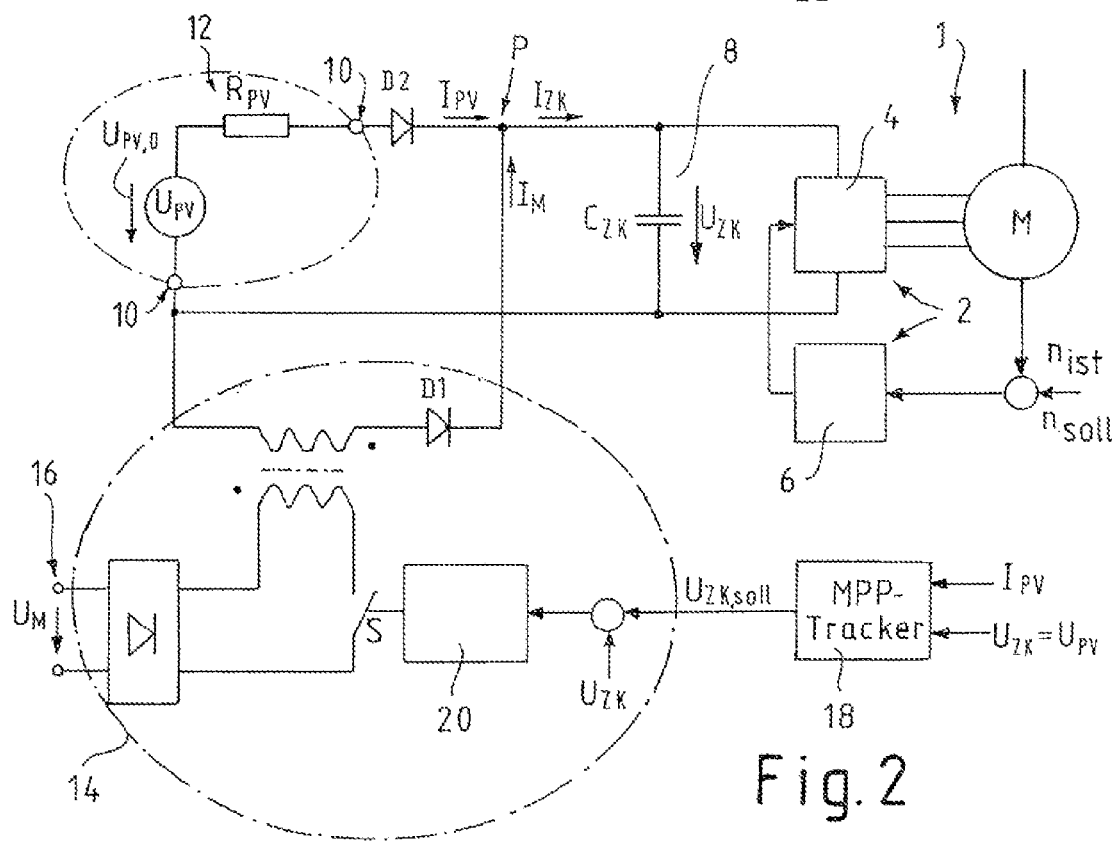
FIG. 2 shows a simplified schematic circuit diagram of the EC motor according to the invention.

A schematic circuit for the directly solar-fed EC motor assembly 1 according to the invention is shown in FIG. 2. By regulating the power supply 14 (AC/DC converter) to a respective constant voltage, the internal resistance is nearly 0, with the inverter operating only in one-quadrant mode. On the other hand, the solar cell generator 12 has a comparatively high internal resistance $R_{PV}$. If the two voltages (output voltage of the power supply unit 14 and photovoltaic voltage of the solar cell generator 12) with the different internal resistances are connected in parallel, a current value from the solar cell generator and the power supply unit results automatically, depending on the operating point of the solar cell generator (as a function of irradiation and temperature; see FIG. 3). These individual currents add up at the circuit node P into the DC link current $I_{ZK}$ of the motor M. Thus the power output of the solar cell generator 12 can be adjusted by varying the respective potential in the DC link 8.

The following applies: $P_{Motor}=P_{Solar}+P_{Netz}=U_{ZK} \cdot I_{PV}+U_{ZK} \cdot I_M$. Alternatively, the power supply unit 14 can also be operated in a constant current mode. The voltage in the DC link would then result as:

$$U_{ZK} = \frac{1}{C_{ZK}} \cdot \int (i_{PV} + i_M - i_{ZK}) dt$$

The sum of the two currents in a defined operating point must be held constant by the MPP regulator 18.

Figure 4:
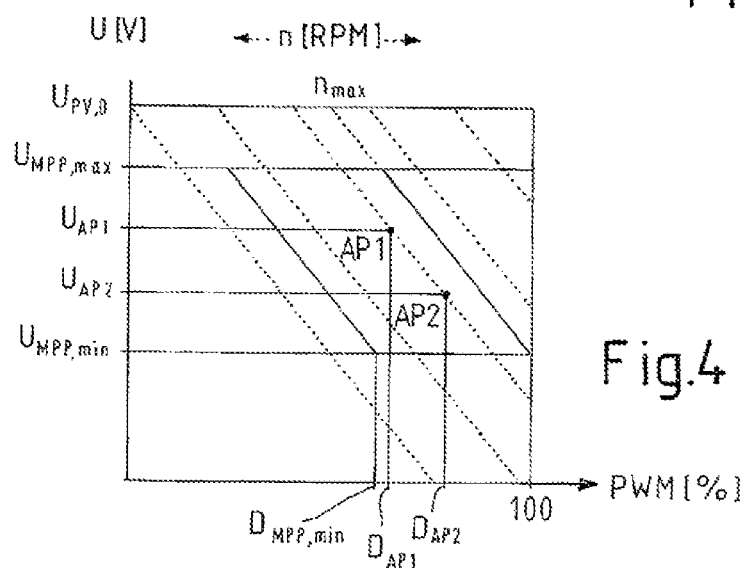
FIG. 4 shows a diagram explaining the connection between solar cell voltage and motor duty cycle.

FIG. 4 shows the operating range of the MPP regulator 18 between $U_{MPPmin}$ and $U_{MPPmax}$ as a diamond-shaped area. Speed curves are indicated with inclined dash lines, each of these lines representing a particular rotational speed. Operating point 1 (AP 1) corresponds to the MPP of the solar cell at defined operating parameters. If the operating parameters change, the AP2 could accordingly be achieved. This AP 2 is distinguished by a lower MPP voltage. So as not to change the motor operating point due to these changed solar cell parameters, the duty cycle of the motor must be increased by the control unit of the commutation electronic unit 2. The motor operating point is specified application-specific with a fixed rotational speed and thus a constant power consumption and power emission. The respective current duty cycle is calculated as:

$$D_{AP1} = \frac{U_{MPPmin}}{U_{MPPactual}} \cdot 100\%$$

Figure 5:
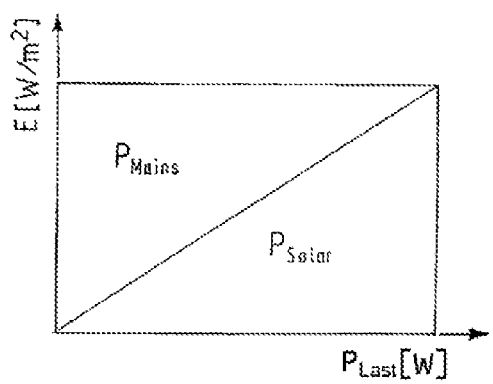
FIG. 5, shows a diagram with illustration of the combined total power.

Finally, FIG. 5 shows the composition of the overall power of the motor as a function of the light irradiation of the sun onto the solar panel of the solar cell generator 12. In this graphic, the power of the solar cell is matched, by way of example, to the power of the motor. This would not be absolutely necessary for the motor operation, however.

The invention is not limited to the illustrated and described exemplary embodiments, but instead also comprises all embodiments functioning equivalently within the meaning of the invention.

While the above description constitutes the preferred embodiment of the present invention, it will be appreciated that the invention is susceptible to modification, variation, and change without departing from the proper scope and fair meaning of the accompanying claims.

The invention claimed is:

1. An EC motor assembly (1), comprising an electronically commutated, permanent magnet-excited DC motor (M) with an upstream commutation electronic unit (2) that is supplied with a DC link voltage ($U_{ZK}$) via a DC link (8), wherein the DC link (8) can be connected directly to a solar cell generator (12) via a first voltage input (10) and via a controllable power supply (14) and a second voltage input (16) to a grid voltage ($U_M$), the DC link voltage ($U_{ZK}$) being variably based on a respective photovoltaic voltage ($U_{PV}$) available from the solar cell generator (12), and the output voltage of the power supply (14) being regulated via an MPP regulator (18) to draw as much power as possible from the solar cell generator (12) by specifying a motor operating point (AP) with a rotational speed target value ($n_{soll}$) and during variations of photovoltaic parameters, being adapted via the commutation electronic unit (2) in such a manner that the motor rotational speed is maintained near the target value ($n_{soll}$).

2. The EC motor assembly according to claim 1, further comprising in that, when the photovoltaic voltage ($U_{PV}$) is completely absent or falls below a defined limit value approaching zero, a predetermined value ($U_{ZKmin}$) that is still sufficient to operate the motor (M) is adjusted for the DC link voltage ($U_{ZK}$) by means of the power supply (14).

3. An EC motor assembly according to claim 1 further comprising in that the commutation electronics unit (2) comprises a power output stage (4) and an associated control unit (6) with speed regulation.

4. An EC motor assembly according to claim 1 further comprising in that the commutation electronics unit (2), together with the power supply (14), and the MPP regulator (18), forms an electronic unit, which is arranged on at least one common circuit board and integrated into a motor housing.

5. An EC motor assembly according to claim 1 further comprising in that the DC link (8) contains a DC link capacitor ($C_{ZK}$).

6. An EC motor assembly according to claim 1 further comprising in that the power supply (14) is an AC/DC switching power supply with an integrated voltage regulator (20).

* * * * *